United States Patent
Saulters et al.

(10) Patent No.: US 10,459,873 B2
(45) Date of Patent: Oct. 29, 2019

(54) METHOD FOR ADAPTIVELY ADJUSTING FRAMERATE OF GRAPHIC PROCESSING UNIT AND COMPUTER SYSTEM USING THEREOF

(71) Applicant: NVIDIA CORPORATION, Santa Clara, CA (US)

(72) Inventors: Scott Saulters, New Taipei (TW); Ratin Kumar, Santa Clara, CA (US); Lieven Leroy, Woodside, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 944 days.

(21) Appl. No.: 13/754,256

(22) Filed: Jan. 30, 2013

(65) Prior Publication Data
US 2014/0092103 A1 Apr. 3, 2014

(30) Foreign Application Priority Data

Sep. 28, 2012 (TW) .............................. 101136128 A (51) Int. Cl.
*G06F 15/00* (2006.01)
*G06F 1/20* (2006.01)
(Continued)

(52) U.S. Cl.
CPC .............. *G06F 15/00* (2013.01); *G06F 1/206* (2013.01); *G06F 1/325* (2013.01); *G06F 1/3215* (2013.01)

(58) Field of Classification Search
CPC .......... G06F 15/00; G06F 1/325; G06F 1/329; G06T 1/20; G09G 5/393; G09G 2330/022;
(Continued)

(56) References Cited

U.S. PATENT DOCUMENTS 6,640,268 B1 * 10/2003 Kumar .................. G06F 13/366
710/15
7,401,243 B2 * 7/2008 Knepper et al. .............. 713/322
(Continued)

FOREIGN PATENT DOCUMENTS

CN 101414173 A * 4/2009
TW 200922380 A 5/2009
(Continued)

OTHER PUBLICATIONS

Wang et al., Power Gating Strategies on GPUs, Oct. 2011, ACM Transactions on Architecture and Code Optimization, vol. 8, No. 3, Article 13, p. 1-25.*
(Continued)

*Primary Examiner* — Samantha (Yuehan) Wang
(74) *Attorney, Agent, or Firm* — Artegis Law Group, LLP (57) ABSTRACT

The invention provides a method for adaptively adjusting a framerate of a graphic processing unit (GPU). For example, when the GPU workload is high and the temperature of the GPU is close to high temperature, the framerate can be decreased to reduce the workload; when the GPU workload is low, the framerate can be permitted to increase to raise the workload. By the present invention, the GPU is permitted to operate at maximum temperature. The method comprises the steps of: (a) receiving an execution parameter associated with at least one GPU; (b) comparing if the execution parameter is greater than a first reference value; and (c) in the event the execution parameter is greater than the first reference value, increasing a sleep time and power-gating the at least one GPU based on the sleep time to adjust the framerate.

19 Claims, 4 Drawing Sheets

(51) Int. Cl.
*G06F 1/3215* (2019.01)
*G06F 1/3234* (2019.01)

(58) Field of Classification Search
CPC ........... G09G 2330/12; G09G 2360/06; G09G 2360/08; G09G 5/006; G09G 5/18; G09G 5/363
See application file for complete search history.

(56) References Cited

U.S. PATENT DOCUMENTS

| | | | |
|---|---|---|---|
| 7,886,164 B1* | 2/2011 | Alben et al. ................... | 713/300 |
| 2011/0213950 A1* | 9/2011 | Mathieson et al. .............. | 712/30 |
| 2013/0201838 A1* | 8/2013 | Homchaudhuri et al. .... | 370/242 |
| 2013/0328890 A1* | 12/2013 | Avkarogullari ....... | G06F 1/3234 |
| | | | 345/501 |

FOREIGN PATENT DOCUMENTS

| | | |
|---|---|---|
| TW | 201016007 A | 4/2010 |
| TW | 201229912 A | 7/2012 |

OTHER PUBLICATIONS

Taiwan Search Report for Application No. 101136128, dated Aug. 6, 2014.

* cited by examiner

METHOD FOR ADAPTIVELY ADJUSTING FRAMERATE OF GRAPHIC PROCESSING UNIT AND COMPUTER SYSTEM USING THEREOF

CROSS-REFERENCE TO RELATED APPLICATIONS

This application is based on and claims the benefit of priority from Taiwan Patent Application 101136128, filed on Sep. 28, 2012, which is hereby incorporated herein by reference.

BACKGROUND OF THE INVENTION

Field of the Invention

The present invention relates to a method for adaptively adjusting a framerate of a graphic processing unit (GPU), and more particularly, to a method for changing the framerate adjustment.

Description of the Related Art

The workload of a graphic processing unit (GPU) varies with user application program(s). For example, when a user performs a high-quality game program, huge amount of GPU workloads are required (i.e. calculating the number of tasks) because the game program typically needs to render complex geometry and, lighting calculations, as well as different viewing angles of the screen. When a user performs general word processing, which involves only 2D processing without animations, the GPU workload is minimized due to little changes at the contents of the screen, and the contents is displayed without lighting or different viewing angles.

However, a conventional GPU changes workload according to different tasks performed by users and cannot directly adjust the workload. Moreover, when the GPU workload is heavy and the temperature of the system is approaching a dangerously high temperature, the clock speeds of the GPU will be decreased (e.g. from the original 100 MHz to 50 MHz) as a protection mechanism to immediately make workload drop to a predetermined stage. However, this approach is unable to slightly reduce the workload. Please also refer to NVIDIA Corporation products GT 21X series for more details.

SUMMARY OF THE INVENTION

It is an aspect of the present invention to provide a method for adaptively adjusting, with a fine granularity, the efficiency of a graphic processing unit (GPU). Particularly, when using a conventional method to change a GPU workload, the workload may not be adaptively adjusted according to the status of the GPU, thus lacking the elasticity of adjustment. As a result, the GPU performance cannot be maximized properly.

It is another aspect of the present invention to provide a method for adaptively adjusting a framerate of a GPU. For example, when the GPU workload is high and the temperature of the GPU is close to high temperature, a framerate can be decreased to reduce the workload; when the GPU workload is low, a framerate can be increased to raise the workload. As a result, GPU can operate at maximum temperature. Particularly, the method is implemented inside the driver of the GPU and is not handled at the application level, so that the method could be used irrespective of the application program(s).

In an embodiment of the present invention, a method for adjusting a framerate of at least one GPU is provided. The method comprises the steps of:

(a) receiving an execution parameter associated with the at least one GPU;

(b) comparing if the execution parameter is larger than a first reference value; and (c) in the event the execution parameter is larger than the first reference value, increasing a sleep time and power-gating the at least one GPU based on the sleep time to adjust the framerate.

A computer system is provided in an embodiment of the present invention. The computer system comprises:

at least one graphic processing unit (GPU);

a detection unit electrically connected to the at least one GPU for detecting an execution parameter associated with the at least one GPU; and a Central Processing Unit (CPU) electrically connected to the at least one GPU and the detection unit for implementing a method for adjusting a framerate of the at least one GPU.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 4, computer system, methods, and computer program products are illustrated as structural or functional block diagrams or process flowcharts according to various embodiments of the present invention. The flowchart and block diagrams in the Figures illustrate the architecture, functionality, and operation of possible implementations of computer system, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

System Architecture

It is understood that embodiments can be practiced on many different types of computer system 100. Examples include, but are not limited to, desktop computers, workstations, servers, media servers, laptops, gaming consoles, digital televisions, PVRs, and personal digital assistants (PDAs), as well as other electronic devices with computing and data storage capabilities, such as wireless telephones, media center computers, digital video recorders, digital cameras, and digital audio playback or recording devices.

Figure 1:
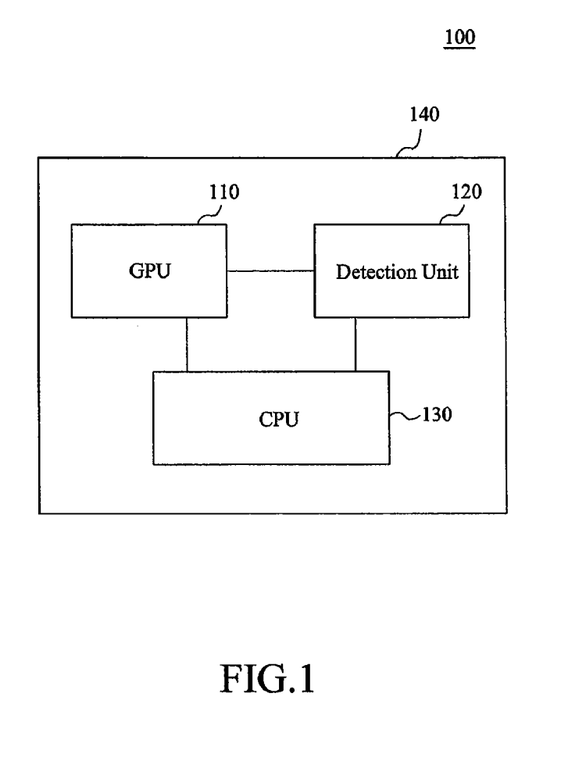
FIG. 1 shows a computer system in an embodiment of the present invention.

FIG. 1 shows a computer system 100 in an embodiment of the present invention. The computer system 100 comprises at least a graphic processing unit (GPU) 110, a detection unit 120, a Central Processing Unit (CPU) 130, and a motherboard 140. The components unrelated to the present invention are omitted in FIG. 1. In the computer system 100 as shown in FIG. 1, the GPU 110 is electrically connected to the detection unit 120, and the CPU 130 is electrically connected to the GPU 110 and the detection unit 120. The GPU 110, detection unit 120, and CPU 130 can be disposed on a motherboard 140 of the computer system 100. The GPU 110 is used for processing images or video information, such as rendering a frame. The GPU 110 can include various function modules, such as a shader module or a rasterization module. Furthermore, the GPU 110 can receive images or video information that need to be processed from the CPU 130 via a communication bus.

The detection unit 120 can be a temperature sensor, a power sensor, or other physical sensors for detecting a parameter (e.g. temperature, power values, or other physical quantities of the GPU 110) in the status in which the GPU 110 is performing a task. The detection unit 120 is not limited to detecting the temperature of the GPU 110 itself, but also detecting the temperature surrounding the GPU 110. For example, both the detection unit 120 and the GPU 110 are provided within a casing (not shown) of a computer system 100, and thus the detection unit 120 can detect the temperature (i.e. the temperature surrounding the GPU 110) within the casing. The parameter detected by the detection unit 120 is used as a reference value for adjusting the workload of the GPU 110. Similarly, the detection unit 120 can be connected to the GPU 110 and the CPU 130 respectively via a different communication bus to transfer information.

The CPU 130 running a GPU driver program is used for receiving a parameter provided by the detection unit 120 and adjusting a framerate of GPU 110 based on the parameter to change the workload. For example, when a parameter exceeds a reference value, it indicates that the GPU 110 may probably be damaged, and thus a framerate of GPU 110 is decreased to reduce the workload; conversely, when a parameter is less than a reference value, it indicates that the workload of GPU 110 is low, and thus a framerate of the GPU 110 is increased to present a better display.

First Embodiment

Figure 2:
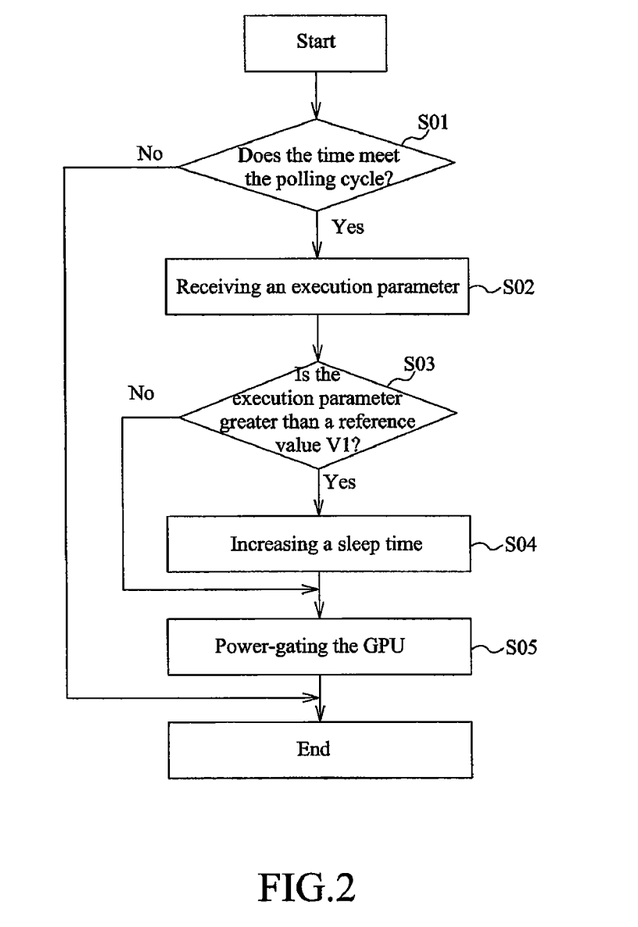
FIG. 2 shows a method for adjusting a framerate of a graphic processing unit (GPU) in an embodiment of the present invention.

FIG. 2 shows a method for adjusting a framerate of a graphic processing unit (GPU) 110 in an embodiment of the present invention. The method can be applied to a computer system 100 as shown in FIG. 1, which is particularly executed by a Central Processing Unit (CPU) 130.

Please refer to both FIG. 1 and FIG. 2 along with the following disclosed content.

In Step S01: Determining if the time meets the polling cycle. If it is determined that the time does not meet the polling cycle, it indicates the end of the method; If it is determined that the time meets the polling cycle, Step S02 to S05 are performed. The polling cycle is used to set the time interval for adjusting a framerate repeatedly performed in Step S02 to S05 as shown in FIG. 2. For example, repeatedly performing Step S02 to S05 every 5 seconds or repeatedly performing Step S02 to S05 every 500 milliseconds (ms) can be set. Details regarding Step S02 to S05 will be described hereinafter.

In addition, the polling cycle setting can be adjusted in accordance with an execution parameter associated with the GPU 110, particularly in accordance with a parameter in the status in which the GPU 110 is performing a task. The settings of polling cycle and execution parameter will be further described hereinafter.

In Step S02: Receiving an execution parameter detected by the detection unit 120. The execution parameter is relevant to the GPU 110, and particularly relevant to a parameter (e.g. temperature or power value of GPU 110) in the status in which the GPU 110 is performing a task, but the present invention is not limited to this. As described above, the temperature of the GPU 110 is not limited to the temperature of the GPU 110 itself, but also the temperature surrounding the GPU 110.

In Step S03: Comparing if the execution parameter is larger than a reference value V1. If the execution parameter is larger than the reference value V1, Step S04 is performed; if the execution parameter is less than the reference value V1, Step S05 is performed. The reference value V1 can be a preset temperature, a preset power value, or other value. For example, the reference value V1 is a target temperature reference value, which is an upper limit of temperature for GPU 110 to work normally. Alternatively, the reference value V1 is a target power reference value, which is an upper limit of power for GPU 110 to work normally. In Step S03, comparing if the execution parameter is larger than the reference value V1 to determine if the framerate of GPU 110 needs to be adjusted to change the workload.

In Step S04: Increasing the sleep time of GPU 110 in the event the execution parameter is larger than the reference value V1. The sleep time is adopted to sleep the calling thread of an application program (such as a game program). As the thread is slept, the power to some but not all components of the GPU 110 is turned off, i.e., the GPU 110 is power-gated. Hence, the frame rate of GPU 110 is changed because the GPU 110 is not working as the thread is slept, such that the workload of GPU 110 is changed. Please make reference to US Pub. 2012/0146706 for more details about engine level power gating (ELPG). For example, if the sleep time is increased, the framerate of GPU 110 is decreased, such that the workload of GPU 110 is reduced; conversely, if the sleep time is decreased, the framerate of GPU 110 will be increased, such that the workload of GPU 110 is increased.

In Step S04, in the event the execution parameter is larger than a reference value V1, which means the workload of GPU 110 may be excessive; therefore, increasing a sleep time can decrease the framerate to achieve the effect of decreasing the workload of GPU 110. In the embodiment of the present invention, the range of the sleep time can be adjusted in accordance with a difference value between the execution parameter and the reference value V1. For example, in the event the execution parameter is greater than the reference value V1 and the difference value between the execution parameter and the reference value V1 increases, the sleep time should be increased. In other words, when the difference value is increased, the sleep time is significantly increased; when the difference value is lower, the sleep time is slightly increased.

In the embodiment of the present invention, the setting of polling cycle can be adjusted based on an execution parameter. For example, in the event the execution parameter is the temperature of GPU 110, when the temperature gets higher (particularly those greater than the reference value V1), the polling cycle time interval should be reduced for more frequently monitoring the status of GPU 110; similarly, when the temperature gets lower (which means less workload of GPU 110), the polling cycle time interval should be increased for less frequently monitoring the status of GPU 110.

Therefore, in Step S04, decreasing the polling cycle time interval can also be included for frequently monitoring the status of the GPU 110 to adjust the workload of the GPU 110 in time. Similarly, as the difference value between the execution parameter and the reference value V1 is increased, the polling cycle can be significantly decreased; as the difference value is lower, the polling cycle can be slightly decreased.

In Step S05: power-gating the GPU 110 based on the sleep time to adjust the framerate. As described above, the sleep time is used for power-gating the GPU 110. Therefore, after increasing the sleep time through Step S04, the GPU 110 is power-gated based on the sleep time to decrease the framerate in Step S05, and thus the workload of GPU 110 can be reduced.

It can be known from the above description that in the present invention the sleep time can be adaptively adjusted by comparing the execution parameter of GPU 110 and the reference value V1 to achieve the effect of controlling the framerate of GPU 110. Furthermore, in the present invention, the polling cycle time interval can be adaptively adjusted based on the relationship between the execution parameter of GPU 110 and the reference value V1 to achieve the effect of frequently or less frequently monitoring the status of GPU 110. Steps S01 to S05 described above are performed by the CPU 130.

Second Embodiment

Figure 3:
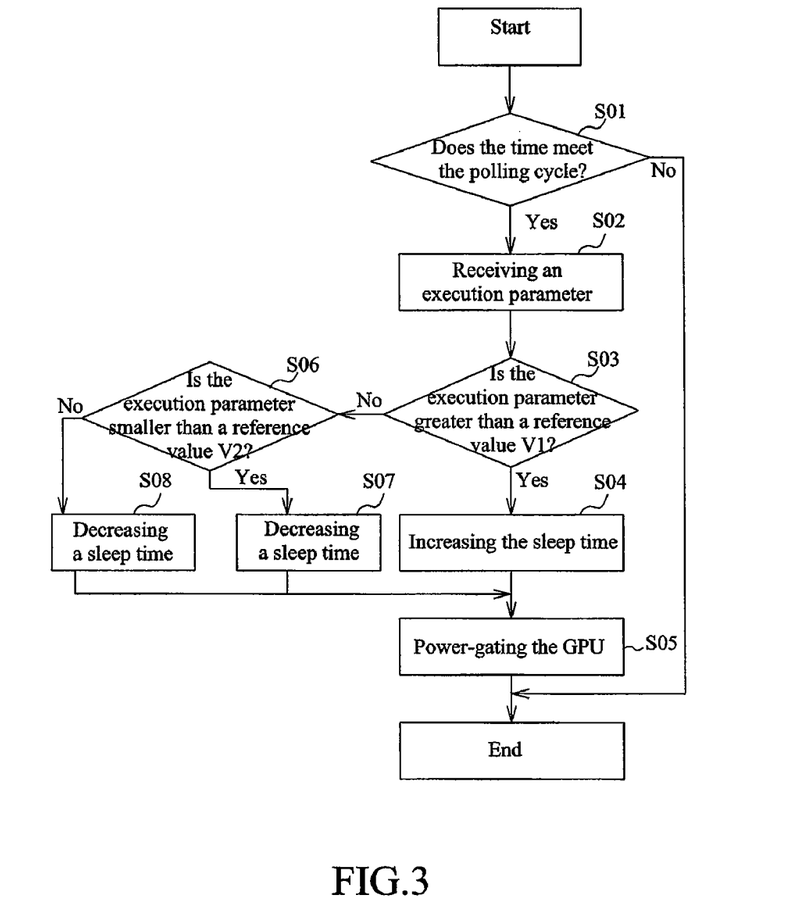
FIG. 3 shows a method for adjusting a framerate of a graphic processing unit (GPU) in another embodiment of the present invention.

FIG. 3 shows a method for adjusting a framerate of the GPU 110 in another embodiment of the present invention. Comparing FIG. 2 and FIG. 3, wherein Steps S01 to S05 are identical with each other, the difference between the two figures lies in Steps S06 to S08. Therefore, Steps S01 to S05 are no longer repeated hereinafter. In Step S03: Comparing if the execution parameter is larger than a reference value V1, in the event the execution parameter is less than the reference value V1, Step S06 is performed.

In Step S06: Comparing if the execution parameter is less than another reference value V2. Similarly, the reference value V2 can be a preset temperature value, a preset power value, or other value. For example, the reference value V2 is a safe temperature reference value, which is a temperature average for the GPU 110 to work normally. Similarly, the reference value V2 can also be a safe power reference value, i.e. a power average for the GPU 110 to work normally. Therefore, if the execution parameter (i.e. temperature in this embodiment) of the GPU is less than the reference value V2 (i.e. a safe temperature reference value), it indicates that the framerate of the GPU can be increased a little more. In other words, the workload is increased.

In Step S07: Decreasing a sleep time of GPU 110 in the event the execution parameter is less than the reference value V2. As described above, if the execution parameter of the GPU is less than the reference value V2, the framerate of the GPU should be increased to raise some workload. In the present invention, the framerate can be increased by reducing the sleep time. Furthermore, in the present invention, the sleep time can be adjusted based on the difference value between the execution parameter and the reference value V2. For example, in the event the execution parameter is less than the reference value V2, and the difference value between the execution parameter and the reference value V2 increases, the sleep time should be reduced. In other words, as the difference value is increased, the sleep time is significantly decreased; as the difference value is lower, the sleep time is slightly decreased. Similarly, increasing the polling cycle time interval can be included in Step S07 to avoid frequently monitoring of the status of the GPU 110. Similarly, as the difference value between the execution parameter and the reference value V2 is increased, the polling cycle can be significantly increased; as the difference value between the two values is lower, the polling cycle is slightly increased.

In Step S08: Decreasing the sleep time of GPU 110 in the event the execution parameter is less than the reference value V2. Step S08 can selectively exist. For example, in an embodiment, when determining that the execution parameter is greater than the reference value V2 and less than the reference value V1 is made in Step S06, Step S05 is directly performed (in other words, Step S08 does not exist). In Step S08, the sleep time of GPU 110 can similarly be decreased, and the polling cycle can be increased. Since the execution value in Step S08 is larger than that in Step S07, the adjustment of the sleep time and polling cycle in Step S08, compared with Step S07, can be equivalent or slightly lower, which will be further described hereinafter with FIG. 4.

Adjustment Ratio of Sleep Time and Polling Cycle

Figure 4:
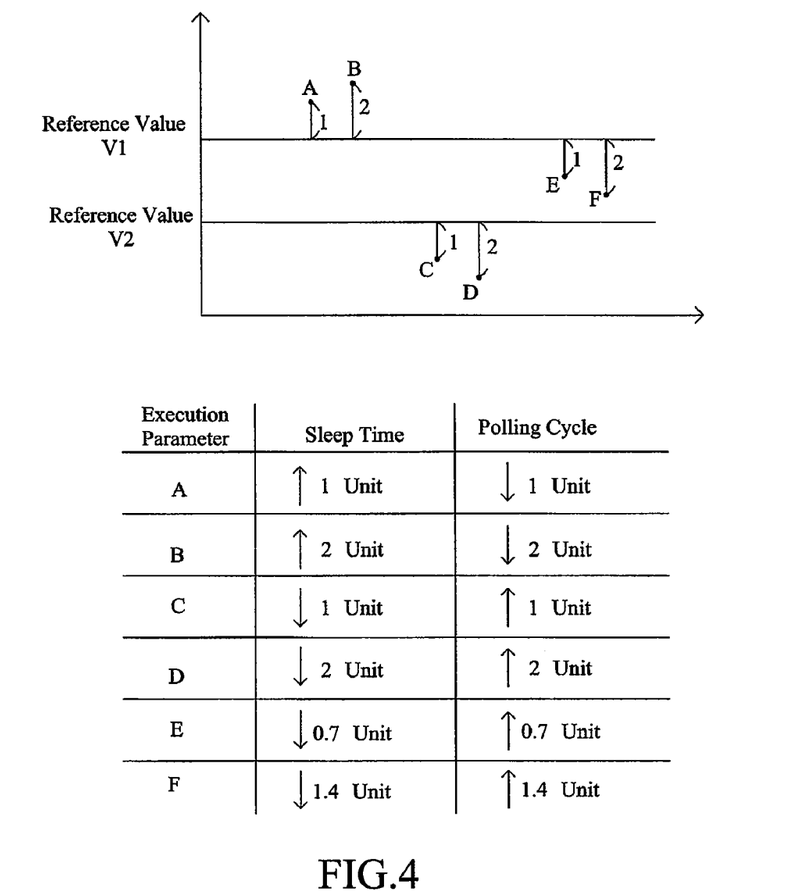
FIG. 4 is a view showing the adjustment of sleep time and polling cycle in an embodiment of the present invention.

FIG. 4 is a view showing the adjustment of the sleep time and polling cycle in an embodiment of the present invention. As shown in FIG. 4, when the execution parameter (i.e. temperature, power value, or other parameter value associated with the GPU) is A, the value A is larger than the reference value V1, and the difference value between the parameter A and the reference value V1 is 1 unit (the amount of 1 unit is not defined in the present invention), the sleep time can be increased, e.g. increased by 1 unit; the polling cycle can be decreased, e.g. decreased by 1 unit. Similarly, when the execution parameter is B, the value B is larger than the reference value V1 and the difference value between the parameter B and the reference value V1 is 2 units, the sleep time can similarly be increased, e.g. increased by 2 units; the polling cycle can be decreased, e.g. decreased by 2 units. It should be known from the comparison of the adjustment of the values A and B, in the event the execution parameter is larger than the reference value V1, as the difference value between the two values is increased, the sleep time is significantly increased; as the difference value between the two values is lower, the sleep time is slightly increased. Also, as the difference value between the two values is increased, the polling cycle can be significantly decreased; as the difference value between the two values is lower, the polling cycle is slightly decreased. Through the adjustment above, the sleep time of the GPU can be increased, such that the framerate is decreased and the workload of the GPU is reduced, which leads to more frequently monitoring of the status of the GPU.

When the execution parameter is C, the value C is less than the reference value V2 and the difference value between the parameter C and the reference value V2 is 1 unit, the sleep time can be decreased, e.g. decreased by 1 unit; the polling cycle can be increased, e.g. increased by 1 unit. Similarly, when the execution parameter is D, the value D is less than the reference value V2 and the difference value between the parameter D and the reference value V2 is 2 units, the sleep time can be similarly decreased, e.g. decreased by 2 units; the polling cycle can be increased, e.g. increased by 2 units. It should be known from the compari-son of adjustment of the value C and D, in the event the execution parameter is less than the reference value V2, if the difference value between the two values is increased, the sleep time is significantly decreased; if the difference value is lower, the sleep time is slightly decreased. Also, as the difference value is increased, the polling cycle can be significantly increased; as the difference value is lower, the polling cycle can be slightly increased. Through the adjustment above, the sleep time of the GPU can be reduced, such that the framerate can be increased and the workload of the GPU can be raised, while needlessly regular monitoring of the status of the GPU can be avoided.

In the event the execution parameter is E or F, which is less than the first parameter and larger than the second parameter, the value E is less than the reference value V1 and the difference value between the two values is 1 unit; therefore, the sleep time can be decreased (e.g. decreased by 0.7 unit) and the polling cycle can be increased (e.g. increased by 0.7 unit). Similarly, the value F is less than the reference value V1 and the difference value between the two values is 2 units; therefore, the sleep time can be decreased (e.g. decreased by 1.4 units) and the polling cycle can be increased (e.g. increased by 1.4 units). It should be known from the above description on the adjustment of the values E and F that as the difference value is increased, the sleep time is significantly decreased; as the difference value is lower, the sleep time is slightly decreased. Also, as the difference value is increased, the polling cycle can be significantly increased; as the difference value is lower, the polling cycle is slightly increased.

In addition, as previously described, since the values E and F are greater than the values C and D, even if the difference value is equivalent, the adjustment of the sleep time and polling cycle can be tied to equivalent or slightly lower. For example, comparing the values C and E, where both the difference value between the value C and the reference value V2 and between the value E and the reference value V1 is 1 unit, but for value C, the sleep time is decreased by 1 unit and the polling cycle is increased by 1 unit; for the value E, the sleep time is decreased by 0.7 unit and the polling cycle is increased by 0.7 unit. The adjustment difference as described above lies in that the value E is closer and lower than the reference value V1, and thus the workload of the GPU should not be excessively increased; in contrast, the value C is closer and lower than the reference value V2 while significantly lower than the reference value V1, and thus the workload of the GPU can be significantly increased.

From the above description, in the present invention, the sleep time can be adaptively adjusted by comparing the execution parameter of the GPU and the reference value V1 or reference value V2 to achieve the effect of controlling a framerate of the GPU. In addition, in the present invention, the polling cycle time interval can be further adaptively adjusted to achieve more or less frequently monitoring of the status of GPU. Particularly, in the present invention, the sleep time and polling cycle can be adjusted based on the difference value between the execution parameter and the reference value V1 or reference value V2.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The invention claimed is:

1. A method for adjusting a framerate of at least one graphic processing unit (GPU), comprising the steps of:
   setting a polling cycle time interval for monitoring the at least one GPU;
   receiving an execution parameter associated with the at least one GPU;
   determining that a value of the execution parameter is larger than a first reference value;
   increasing a sleep time for the at least one GPU based on the value of the execution parameter;
   adjusting the polling cycle time interval based on a relationship between the value of the execution parameter and the first reference value;
   determining that the value of the execution parameter has become less than a second reference value, wherein the second reference value is less than the first reference value; and
   decreasing the sleep time for the at least one GPU based on the value of the execution parameter.

2. The method of claim 1, wherein the execution parameter is a temperature value of the at least one GPU.

3. The method of claim 1, wherein the execution parameter is a power value of the at least one GPU.

4. The method of claim 1, further comprising:
   repeatedly performing the receiving step, the step of determining that the value of the execution parameter is larger than the first reference value, and the increasing step in accordance with the polling cycle time interval; and
   determining that the value of the execution parameter remains larger than the first reference value,
   wherein adjusting the polling cycle time interval comprises decreasing the polling cycle time interval.

5. The method of claim 1, wherein increasing the sleep time comprises adjusting the sleep time based on a difference value between the value of the execution parameter and the first reference value.

6. The method of claim 5, further comprising:
   determining that the difference value between the value of the execution parameter and the first reference value has increased,
   wherein increasing the sleep time comprises additionally increasing the sleep time.

7. The method of claim 1, further comprising:
   repeatedly performing the receiving step, the step of determining that the value of the execution parameter is less than a second reference value, and the decreasing step in accordance with the polling cycle time interval;
   determining that the value of the execution parameter remains less than the second reference value,
   wherein adjusting the polling cycle time interval comprises increasing the polling cycle time interval.

8. The method of claim 1, wherein decreasing the sleep time comprises adjusting the sleep time based on a difference value between the value of the execution parameter and the second reference value.

9. The method of claim 8, further comprising:
   determining that the difference value between the value of the execution parameter and the second reference value has increased,
   wherein decreasing the sleep time comprises additionally decreasing the sleep time.

10. The method of claim 1, further comprising:
    repeatedly performing the receiving step in accordance with the polling cycle time interval;
    determining that the value of the execution parameter has become larger than the second reference value and less than the first reference value; and
    wherein adjusting the polling cycle time interval comprises increasing the polling cycle time interval.

11. The method of claim 1, further comprising:
    determining that the value of the execution parameter has become larger than the second reference value and less than the first reference value; and
    adjusting the sleep time for the at least one GPU based on a difference value between the value of the execution parameter and the first reference value.

12. The method of claim 11, further comprising:
    determining that the difference value between the value of the execution parameter and the first reference value has increased
    wherein adjusting the sleep time comprises decreasing the sleep time.

13. The method of claim 1, wherein the first reference value comprises an upper limit of the execution parameter for safe operation of the at least one GPU.

14. A non-transitory computer-readable medium storing instructions, that when executed by a processor, cause a computer system to adjust a framerate of at least one graphic processing unit (GPU), by performing the steps of:
    setting a polling cycle time interval for monitoring the at least one GPU;
    receiving an execution parameter associated with the at least one GPU;
    determining that a value of the execution parameter is larger than a first reference value;
    increasing a sleep time for the at least one GPU based on the value of the execution parameter;
    adjusting the polling cycle time interval based on a relationship between the value of the execution parameter and the first reference value;
    determining that the value of the execution parameter has become less than a second reference value, wherein the second reference value is less than the first reference value; and
    decreasing the sleep time for the at least one GPU based on the value of the execution parameter.

15. The computer-readable medium of claim 14, further comprising:
    repeatedly performing the receiving step, the step of determining that the value of the execution parameter is larger than the first reference value, and the increasing step in accordance with the polling cycle time interval; and
    determining that the value of the execution parameter remains larger than the first reference value,
    wherein adjusting the polling cycle time interval comprises decreasing the polling cycle time interval.

16. The computer-readable medium of claim 14, wherein increasing the sleep time comprises adjusting the sleep time based on a difference value between the value of the execution parameter and the first reference value.

17. The computer-readable medium of claim 16, further comprising:
    determining that the difference value between the value of the execution parameter and the first reference value has increased,
    wherein increasing the sleep time comprises additionally increasing the sleep time.

18. The computer-readable medium of claim 14, further comprising:

repeatedly performing the receiving step, the step of determining that the value of the execution parameter is less than a second reference value, and the decreasing step in accordance with the polling cycle time interval;

determining that the value of the execution parameter remains less than the second reference value, wherein adjusting the polling cycle time interval comprises increasing the polling cycle time interval.

19. A computing device for adjusting a framerate of at least one graphic processing unit (GPU), the computing device comprising:

a processor; and a memory coupled to the processor, wherein the memory includes a program having instructions that, when executed by the processor, cause the processor to:

set a polling cycle time interval for monitoring the at least one GPU;

receive an execution parameter associated with the at least one GPU;

determine that a value of the execution parameter is larger than a first reference value;

increase a sleep time for the at least one GPU based on the value of the execution parameter;

adjust the polling cycle time interval based on a relationship between the value of the execution parameter and the first reference value;

determine that the value of the execution parameter has become less than a second reference value, wherein the second reference value is less than the first reference value; and decrease the sleep time for the at least one GPU based on the value of the execution parameter.

\* \* \* \* \*